United States Patent Office 3,567,601
Patented Mar. 2, 1971

3,567,601
PROCESS FOR POLYMERIZING
TETRAHYDROFURAN
Kenneth R. Lucas, James F. Cetnar, and Edward L. Kay, Akron, Ohio, assignors to The Firestone Tire & Rubber Company, Akron, Ohio
No Drawing. Filed Sept. 12, 1968, Ser. No. 759,504
Int. Cl. C07b 3/00, 29/06
U.S. Cl. 204—78   11 Claims

ABSTRACT OF THE DISCLOSURE

The process described herein comprises an electrolytic method for polymerizing tetrahydrofuran to polytetramethylene oxide using as the electrolyte an alkali metal perchlorate or an ammonium perchlorate. The polymerization is effected in the anodic compartment of an electrolytic cell. Other monomers such as styrene or other vinyl monomers, including dienes such as isoprene, 1,3-butadiene, etc., can be polymerized simultaneously, if desired, in the cathodic compartment of the cell and using either the same perchlorate or other electrolyte in the cathodic compartment.

BACKGROUND OF THE INVENTION

Field of the invention

This invention relates to the electrolytic polymerization of tetrahydrofuran. More specifically it relates to anodic polymerization of tetrahydrofuran in the presence of a perchlorate, such as lithium perchlorate, as the electrolyte. More specifically, it relates to such polymerization in the anodic compartment of an electrolytic cell. Moreover it relates to simultaneous polymerization of other compounds in the cathodic cell of the system.

Description of the related prior art

It is generally known that various vinyl compounds such as styrene, methyl methacrylate and acrylonitrile have been polymerized electrolytically using two electrodes immersed in a non-aqeuous, substituted hydrocarbon liquid or the monomer itself as solvent in the presence of an electrolyte such as a quaternary ammonium compound as electrolyte. For example, Funt et al. (Canadian Jour. Chem. 44, 711 (1966)) reports the electrolytic polymerization of styrene using tetrahydrofuran as solvent and $NaAl(C_2H_5)_4$ or $NaB(C_6H_5)_4$ as electrolyte. Funt et al. (Canadian Jour. Chem. 42, 27–28 (1964)) also show the electrolytic polymerization of styrene in dimethyl formamide using $KNO_3$ as the electrolyte. Funt also reviews the literature on the electrolytic polymerization of various vinyl compounds in an article in Marcomolecular Reviews vol. 1, 35 (1966).

U.S. Pats. 3,140,276 and 3,245,889 disclose the electrolytic polymerization of acrylonitrile using, in addition to excess acrylonitrile as solvent, dimethyl formamide, hexamethyl phosphoramide, dimethyl sulfoxide and pyridine and using as the electrolyte a quaternary ammonium halide. The use of potassium perchlorate and tetrapropyl perchlorate are shown to be unsuccessful for this purpose. In fact no references are found which show the prechlorates to be used sucessfully, particularly in the anodic compartment, nor are there any references showing the polymerization of tetrahydrofuran.

SUMMARY OF THE INVENTION

In accordance with the present invention, it has been found that polymerization of tetrahydrofuran to polytetramethylene oxide can be effected at the anodic section of an electrolytic cell using an alkali metal or ammonium, including substituted ammonium, perchlorate as the electrolyte. In addition to the unexpectedness of being able to polymerize tetrahydrofuran to polytetramethylene oxide, it is surprising to find that polymerization can be conducted simultaneously in the cathodic section of the cell by having another monomer present such as isoprene, 1,3-butadiene, styrene, methyl methacrylate, etc. Moreover in such cases of simultaneous polymerization, where an electrolyte other than the perchlorate works more efficiently in polymerizing the other monomer, such as $NaB(C_6H_5)_4$, $NaAl(C_2H_5)_4$, etc., it is possible to have the cathodic and anodic cells separated by a fritted glass divider and to have in the cathodic compartment of an electrolytic cell an electrolyte more efficient for polymerization of styrene, etc., such as $NaB(C_6H_5)_4$, and in the anodic compartment a perchlorate such as $LiClO_4$ for polymerization of the tetrahydrofuran.

In the practice of this invention, it is generally advantageous to have at least 0.5, preferably at least 1, part by weight of perchlorate per 100 parts by weight of monomer and any solvent or diluent that may be used. Generally there is no need to use more than 10–15 parts of perchlorate per 100 parts of monomer and diluent. In some cases the upper limit is determind by solubility. The polymerization is effectively conducted in the range of 0°–75° C., preferably 20°–50° C., with the upper limit sometimes being determined by the boiling piont of the monomer.

While the applicants do not desire to be limited to such a theory, it is believed that the polymerizations at the cathode are effected either by the direct electron transfer to monomer (styrene, diolefin, etc.) or by the indirect electron transfer to the monomer through an alkali metal or a reduced quaternary ammonium cation produced at the cathode. Polymerizations at the anode are effected either by direct electron transfer from the monomer or by the indirect electron transfer by oxidation of perchlorate ion to perchlorate radical. This may explain why one type of monomer is polymerized at the cathode, and another type of monomer is polymerized at the anode, depending on whether the polymerization is effected either by the addition of electrons, or by the removal of electrons.

The electrolytes that can be used in the anodic section of the electrolytic cell to polymerize tetrahydrofuran include the alkali metal perchlorates, such as lithium, sodium, potassium, cesium, rubidium and ammonium perchlorate and the alkyl ammonium perchlorates in which the alkyl groups have 1–6 carbon atoms in each alkyl group. Such derivatives include tetramethyl, tetraethyl, tetra-n-propyl, tetra-n-butyl, tetraisopropyl, tetra-sec.-butyl, tetraisoamyl, tetra-n-hexyl, etc. Mixed derivatives such as diethyl dipropyl ammonium, ethyl tripropyl ammonium, dimethyl dibutyl, etc., can also be used but it is generally simpler to prepare the ammonium derivatives with identical alkyl radicals. Also suitable are the mono, di and trisubstituted ammonium perchlorates such as the monoethyl ammonium, the dibutylammonium, the triamylammonium the tripropylammonium, etc.

Monomers that can be used for simultaneous polymerization at the cathode include various vinyl monomers, such as vinyl aromatics, i.e. styrene, vinyl toluene, vinyl naphthalene, vinyl diphenyl, etc., acrylonitrile, methacrylonitrile, methyl methacrylate, various conjugated alkadienes having 4–10 carbon atoms, such as isoprene, 1,3-butadiene, piperylene, 2,3-dimethyl-1,3-butadiene, 2-phenyl-1,3-butadiene, etc.

Tetrahydrofuran polymers can be produced having molecular weights of 5,000–5,000,000. Polystyrene of molecular weights of 35,000–2,000,000, and polyisoprene of 40,000–1,000,000 molecular weights can also be produced.

When a vinyl aromatic, such as styrene, is used for simultaneous polymerization, a fairly high concentration (10–40% by weight) is used.

When a diene, such as isoprene, is used as a monomer, the concentration is advantageously 15–30% by weight. The concentration of electrolyte such as perchlorate, sodium tetraphenylboron, etc., is advantageously 0.5–10% preferably 1–4% by weight of the total solution.

The concentration of tetrahydrofuran is usually about 60–99.5% by weight. If other solvents or diluents are used, the concentration of THF can be as low as 10%.

The electrolytic cells used in the process of this invention are similar to those normally used for conducting electrolytic polymerizations. Where the same electrolyte is used in both the anodic and cathodic sections, it is not necessary to use a divider between the two sections. However, a divider is preferred since the products at the anode can react with those generated at the cathode. When a different electrolyte is used, such as a perchlorate for the tetrahydrofuran and a different electrolyte such as $NaB(C_6H_5)_4$ for styrene, etc., then a divider such as fritted glass or a permeable membrane is very definitely preferred.

After the solution or solutions are transferred to the cells, they are degassed by the usual freeze-vacuum-thaw method described in the literature. After degassing, the solution is generally electrolyzed by application of a constant voltage of 4–100 volts between the electrodes. Higher currents may be obtained by using even higher voltages, such as up to 2,000 volts. Generally the current density is 1–100, preferably 1–10 milliamps per square inch for a length of time from 2 to 30 hours, depending on the amount of monomer to be polymerized. With extremely high voltages shorter reaction periods such as 30 minutes can be used. Normally between 10 and 10,000 coulombs of electricity are consumed during this period. At the end of the electrolysis the catholyte and anolyte are separately poured into methanol or other appropriate precipitant. The methanol is decanted and the precipitated polymers are dried in a vacuum oven at 55° C.

In the electrolytic cells, the electrodes can be of platinum, carbon, graphite, lead, lead oxide, zinc, mercury, etc. In addition to fritted glass, the divider which is sometimes used between the cathodic and anodic cells can be of semi-permeable membrane or other material such as porous alundum diaphragms that will allow passage of electrons.

PREFERRED EMBODIMENTS

The invention is illustrated by the following examples. These examples are given for purpose of illustration and are not intended to limit the scope of the invention nor the manner in which it may be practiced. Unless specifically indicated otherwise, parts and percentages are given by weight.

The electrolytic cell used in the examples below is constructed completely of glass and contains two platinum electrodes, one inch square, separated by a fine porosity sintered glass frit. Resin-coated stirring bars are used to provide stirring during the electrolysis. The cell is cleaned and oven-dried before each experiment. Before charging the cell a vacuum is applied for one hour and then vented to dried nitrogen. Nitrogen pressure is used to transfer the tetrahydrofuran containing the electrolyte and also whatever other monomer is used. Oxygen is removed by freeze-thaw degassing the cell contents. After freeze-thaw degassing the contents of the cell are electrolyzed at a current density of 1–10 milliamps per square inch for a length of time between 2 hours and 30 hours. Care is taken to exclude moisture and the red color of living polystyrene anion is observed when styrene is used. If some water is present an induction period is observed which depends upon current density and the amount of water.

Example I

Each compartment of an electrolytic cell, in which the two cells are separated by a fritted glass of coarse porosity, is charged with 28.5 grams of tetrahydrofuran, 0.5 gram of lithium perchlorate and 10 grams of styrene. The contents of the cell are then degassed by the usual freeze-vacuum-thaw method. The initial cell resistance is 34.3KΩ; the initial cell current is 1.75 milliamps; the reagents are at room temperature (24.6° C.); the initial voltage is 60 volts; the period of reaction is 3 hours and 39 minutes; and a total of 21.8 coulombs are passed. Both the anolyte and the catholyte solutions are poured into methanol. The anolyte yields 0.2 gm of polytetramethylene oxide, and the catholyte yields 0.1 gram of polystyrene.

Example II

The procedure of Example I is repeated using in each compartment a solution containing 0.7 gram $LiClO_4$, 9.2 grams styrene and 36.1 grams tetrahydrofuran. A constant voltage of 60.0 volts is applied to give an initial cell current of 2.95 milliamps and an average current of 2.06 milliamps. Electrolysis time is 10 hours during which 71.4 coulombs are passed. At the end of the run the catholyte is aspirated from the cell and the cathode compartment washed out with THF. The catholyte is poured into methanol and a crumbly precipitate of polystyrene is obtained of 1.718 grams. The anolyte is very viscous and it takes 2–3 hours to pour this into methanol. The anode compartment is then washed with THF to dissolve remaining polymer and the resultant solution is poured into a separate beaker of methanol. The polymer obtained upon pouring the anolyte into methanol is white and remains viscous. After standing two days the methanol is poured off and the white viscous polymer is washed with additional methanol and then three times with distilled water. This polymer floats on water and remains somewhat fluid. It is redissolved in THF and reprecipitated in methanol, then dried and weighed. It is a waxy solid representing a yield of 17.5 grams of polytetramethylene oxide. The polystyrene has an average molecular weight of 60,000, and the THF polymer has an average molecular weight of about 80,000.

Example III

The procedure of Example I is repeated using a total of 73.6 grams of tetrahydrofuran, 1.4 grams of lithium perchlorate and 18.4 grams of styrene. 60 volts are applied to the cell for 10 hours. Initially the current and resistance are 3.0 milliamperes and 20,000 ohms respectively. A total of 71.4 coulombs are used. The polystyrene isolated from the catholyte shows a yield of 1.72 grams of the polymer having an average molecular weight of 60,000 and a distribution from 2,000 to 680,000. From the anolyte there is separated 17.5 grams of polymer identified by infrared spectroscopy as polytetramethylene oxide.

Example IV

The procedure of Example I is repeated using in place of the lithium perchlorate an equivalent amount of tetrabutylammonium perchlorate. Similar results are obtained.

Example V

The procedure of Example I is repeated except that an equivalent amount of sodium tetraphenyl boron is used in place of the $LiClO_4$ in the catholyte solution. Polystyrene is obtained at the cathode and polytetramethylene oxide at the anode.

Example VI

The procedure of Example I is repeated using in each compartment a solution of 9.2 grams of isoprene, 34.9 grams of tetrahydrofuran and 0.67 gram of lithium perchlorate. A voltage of 60 volts is applied to the cell for a period of 21 hours. The initial resistance is 37,000 ohms and the average current is 1.27 milliamps. 9. 3 grams of polyisoprene is isolated from the catholyte. This has an average molecular weight of 400,000 with a distribution from 10,000 to 2,000,000. Infrared analysis shows this polymer to be composed of 73% 3,4-polyisoprene, 9% 1,4-polyisoprene and 18% 1,2-polyisoprene. From the anolyte there is recovered 20.75 grams of polymer which is shown by infrared analysis to be polytetramethylene oxide.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:
1. The process of polymerizing tetrahydrofuran to polytetramethylene oxide in an electrolytic cell having an anode and a cathode comprising the steps of:
   (a) immersing the anode of the electrolytic cell in a solution comprising 10–99.5 percent by weight tetrahydrofuran and 0.5–15 percent by weight of a perchlorate selected from the class consisting of alkali metal perchlorates, ammonium perchlorates and alkyl substituted ammonium perchlorates; and
   (b) applying to the electrodes of said electrolytic cell a voltage of 4–2000 volts for a period of at least 30 minutes.
2. The process of claim 1 in which said voltage is 4–100 volts, and the period is at least 2 hours.
3. The process of claim 2 in which said perchlorate is lithium perchlorate.
4. The process of claim 2 in which said perchlorate is a tetraalkyl ammonium perchlorate in which each alkyl radical has 1–6 carbon atoms.
5. The process of claim 2 in which said perchlorate is tetra-n-butylammonium perchlorate.
6. The process of claim 2 in which the cathode is immersed in a solution comprising 10–40 percent by weight of styrene.
7. The process of claim 2 in which the cathode is immersed in a solution comprising 15–30 percent by weight of a conjugated diene having 4–10 carbon atoms.
8. The process of claim 6 in which said styrene solution also contains 1–4 percent by weight of sodium tetraphenylboron.
9. The process of claim 6 in which said styrene solution also containe 1–4 percent by weight of sodium tetraethylboron.
10. The process of claim 9 in which said diene is isoprene.
11. The process of claim 9 in which said diene is 1,3-butadiene.

References Cited
UNITED STATES PATENTS

| | | | |
|---|---|---|---|
| 3,477,922 | 11/1969 | Blues | 204—72 |
| 2,714,576 | 8/1955 | Clauson-Kaas | 204—78 |

JOHN H. MACK, Primary Examiner

R. L. ANDREWS, Assistant Examiner

U.S. Cl. X.R.
204—72